United States Patent
Gong et al.

(10) Patent No.: US 10,997,705 B2
(45) Date of Patent: May 4, 2021

(54) SYSTEM AND METHOD FOR QUANTITATIVE ANALYSIS OF BOREHOLE IMAGES

(71) Applicant: Chevron U.S.A. Inc., San Ramon, CA (US)

(72) Inventors: Bo Gong, Houston, TX (US); Dustin J. Keele, Houston, TX (US); Emmanuel Toumelin, Houston, TX (US); Simon Clinch, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 16/601,818

(22) Filed: Oct. 15, 2019

(65) Prior Publication Data
US 2020/0134803 A1    Apr. 30, 2020

Related U.S. Application Data

(60) Provisional application No. 62/750,623, filed on Oct. 25, 2018.

(51) Int. Cl.
*G06T 7/00* (2017.01)
*G06N 20/00* (2019.01)
*G06N 3/08* (2006.01)

(52) U.S. Cl.
CPC ............ *G06T 7/0002* (2013.01); *G06N 3/08* (2013.01); *G06N 20/00* (2019.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 5,251,286 A | 10/1993 | Wiener et al. | |
| 6,011,557 A | 1/2000 | Keskes et al. | |
| 6,266,618 B1 | 7/2001 | Ye et al. | |
| 6,337,568 B1* | 1/2002 | Tutunji | G01N 24/081 324/303 |
| 6,381,542 B1 | 4/2002 | Zhang et al. | |

(Continued)

FOREIGN PATENT DOCUMENTS

| | | |
|---|---|---|
| WO | 01/31365 A1 | 5/2001 |
| WO | 2014/070572 A2 | 5/2014 |
| WO | 2015/127349 A1 | 8/2015 |

OTHER PUBLICATIONS

PCT International Search Report and Written Opinion, dated Jan. 28, 2020, issued in International Application No. PCT/IB2019/058764, filed on Oct. 15, 2019, 12 pages.

(Continued)

*Primary Examiner* — Fayyaz Alam
(74) *Attorney, Agent, or Firm* — Marie L. Clapp (57) ABSTRACT

A method is described for ways to generate a Fraction of Sand ($F_{sand}$) estimate and net-to-gross (NTG) estimate of sand in a formation using a machine-learning algorithm such as a neural network based on borehole image logs. The method may use the $F_{sand}$ and other information to estimate hydrocarbons in place in a subsurface formation. The method may be executed by a computer system.

15 Claims, 9 Drawing Sheets

(56) References Cited

U.S. PATENT DOCUMENTS

| 8,417,495 | B2 | 4/2013 | Dashevskiy |
| 2004/0117121 | A1* | 6/2004 | Gray ................... G01V 1/30 702/11 |
| 2004/0257240 | A1 | 12/2004 | Chen et al. |
| 2015/0241591 | A1* | 8/2015 | Burmester ............ G06K 9/64 702/7 |

OTHER PUBLICATIONS

Tanwi Basu et al., "Facies analysis: integration of core and log data using a neural network as in put for reservoir modeling in Betty Filed, Malaysia", The Leading Edge, Aug. 2004, p. 794-797, XP001210333.

* cited by examiner

SYSTEM AND METHOD FOR QUANTITATIVE ANALYSIS OF BOREHOLE IMAGES

CROSS-REFERENCE TO RELATED APPLICATIONS

This application claims priority from U.S. Provisional Patent Application 62/750,623 filed Oct. 25, 2018.

STATEMENT REGARDING FEDERALLY SPONSORED RESEARCH OR DEVELOPMENT

Not applicable.

TECHNICAL FIELD

The disclosed embodiments relate generally to techniques for quantitative analysis of borehole images obtained from a wellbore through a subsurface volume of interest and, in particular, to a method of estimating net sand in a formation traversed by a wellbore by analysis of borehole images from the wellbore.

BACKGROUND

Deepwater reservoirs often consist of highly laminated sand-shale sequences, where individual beds are too fine to be fully resolved by standard logs. Note that as is understood in the art, the term sand may refer to sandstone. Without appropriate characterization, thin beds could be under-estimated or neglected, which leads to pessimistic predictions on hydrocarbon pore volume and well deliverability, and reservoir quality is routinely under-predicted. Consequently, laminated reservoirs are considered a common struggle for petrophysical analysis.

To characterize the thin beds with better accuracy, one could take advantage of high-resolution borehole images, which can detect extremely small formation features (e.g., millimeter scale). In traditional thin-bed analysis, sand counting is usually done by applying a user-specified cutoff on a 1-D high-resolution curve extracted from borehole images. The workflow generally requires meticulous image QC, multiple pre-processing steps and log calibration, and the results are often highly sensitive to the cutoff selection. Moreover, due to the uncalibrated nature of borehole imaging tools, cutoffs selected in one well are not necessarily applicable to other wells, even if they share the same formation systems. This has prevented consistent standards while evaluating multiple wells in one field or asset.

The ability to define the location and quantity of hydrocarbons in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved characterization of thin beds in the subsurface to allow improved quantification of hydrocarbons in place in subsurface reservoirs.

SUMMARY

In accordance with some embodiments, a method of borehole image analysis including receiving at least one borehole image wherein the at least one borehole image traverses a subsurface formation including sand and non-sand layers; preparing the at least one borehole image to generate prepared borehole images; selecting a subset of the prepared borehole images to generate training data; labeling the training data with sand fraction values based on core analysis; training a neural network using the training data to generate a trained neural network; and predicting a fraction of sand (Fsand) for the prepared borehole images using the trained neural network is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of analyzing borehole images. These embodiments are designed to be of particular use for borehole image analysis in areas with thin sand beds.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The embodiments described herein for borehole image analysis provide ways to generate a Fraction of Sand ($F_{sand}$)

estimate and net-to-gross (NTG) estimate of sand in a formation using a machine-learning algorithm such as a neural network. Compared to conventional methods for estimating sand in a formation with borehole images, such as applying cut-offs on an extracted resistivity log, the embodiments provided herein take full advantage of borehole images as 2D arrays, which reduces uncertainties caused by image calibration, thin-bed effect, etc.; furthermore, the embodiments herein do not require image flattening, pad equalization or averaging; and make non-linear differentiation between sand and non-sand, which better reflects the complexity of real formations. The predicted $F_{sand}$, which has a higher resolution than what could be derived from standard well logs like Gamma Ray, can be integrated with other logs for petrophysical and geological analysis. Additionally, the machine-learning algorithm, once trained, can be applied to additional wells in a field more reliably compared with conventional resistivity cut-off methods.

Figure 1:
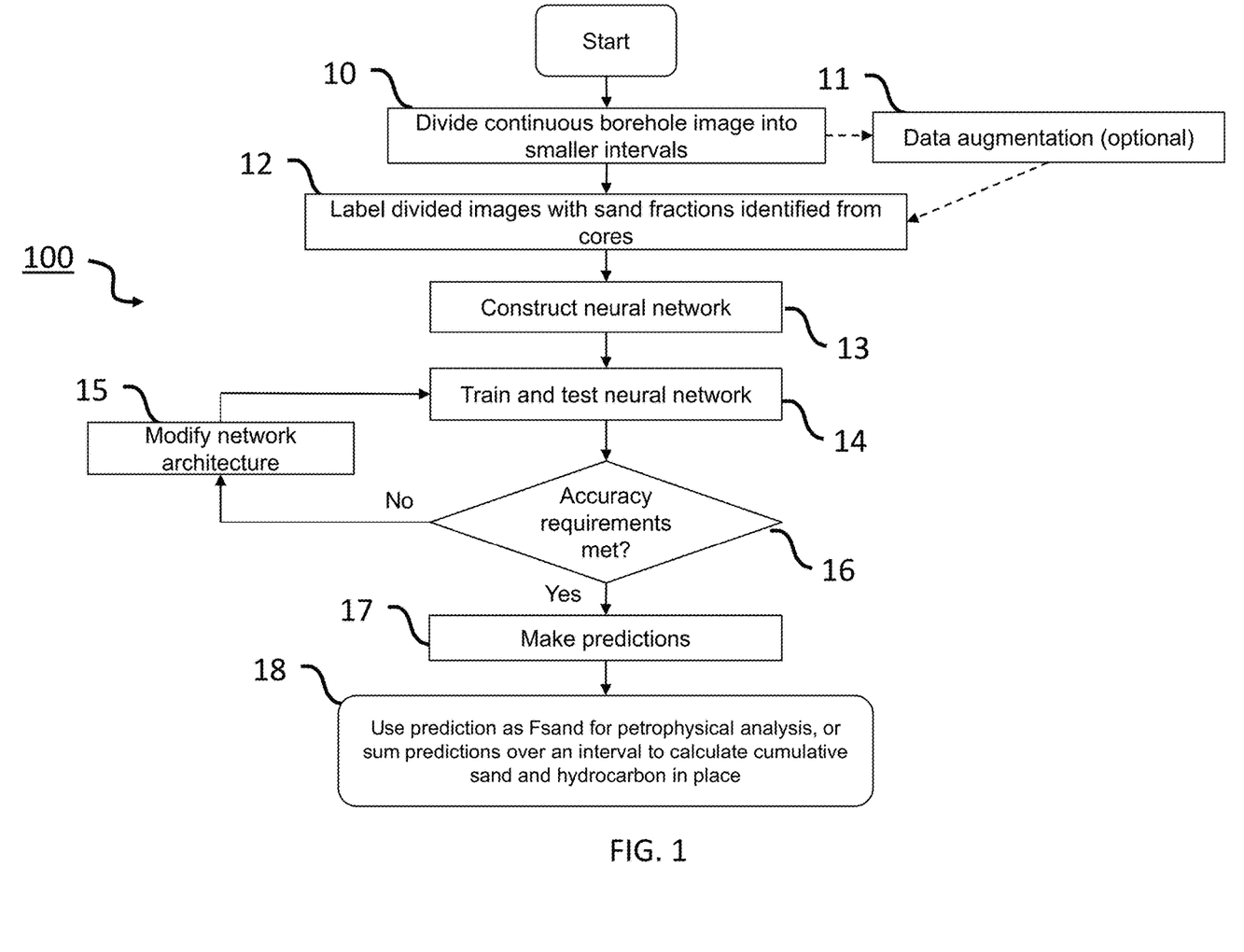
FIG. 1 illustrates a flowchart of a method of borehole image analysis, in accordance with some embodiments.
Figure 2:
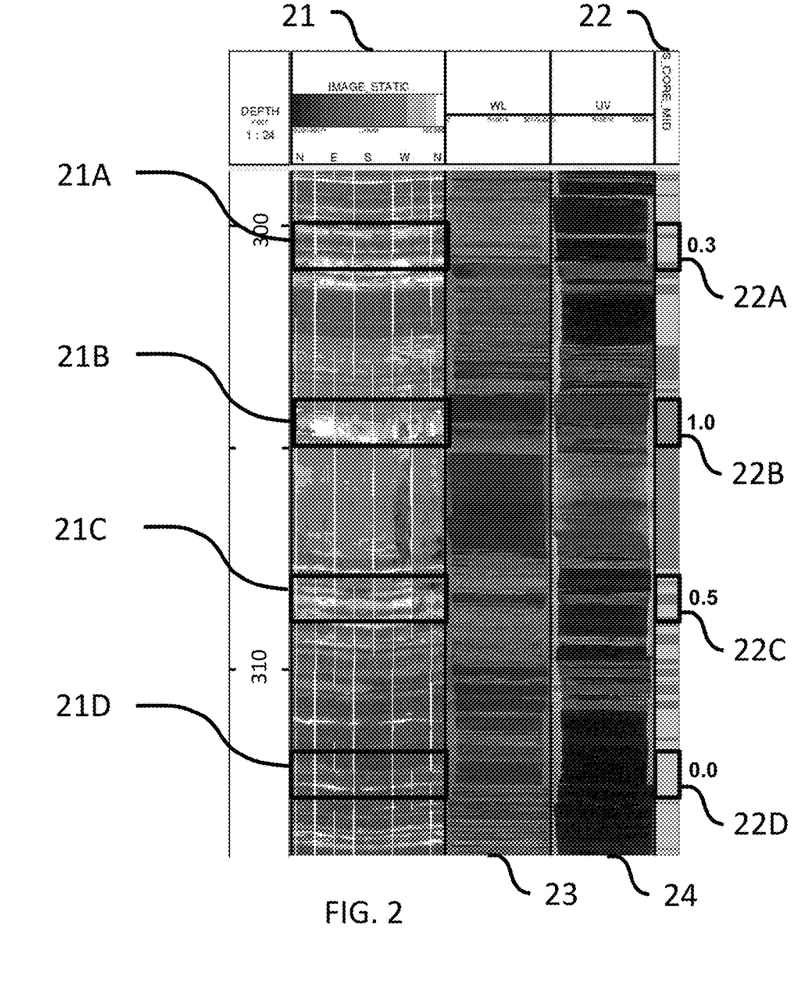
FIG. 2 illustrates a step of an embodiment.
Figure 3:
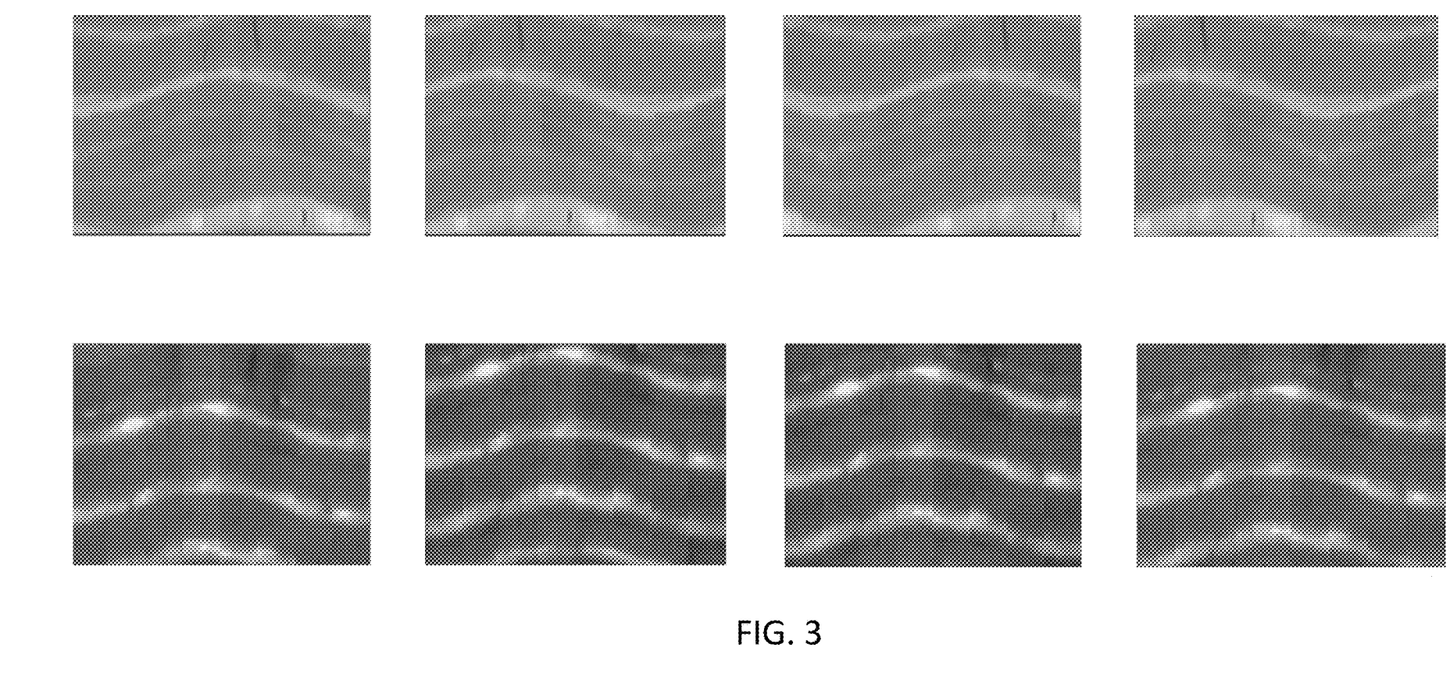
FIG. 3 illustrates a step of an embodiment.

FIG. 1 illustrates a flowchart of an embodiment of a method 100 for estimating $F_{sand}$ from borehole images in order to perform petrophysical analysis and/or estimate hydrocarbons in a formation. The method begins by receiving at least one borehole image at native resolution (usually 0.2-1.2 inch) which is divided into smaller intervals at operation 10. The divided images are labeled with sand fractions identified from cores at operation 12. This is illustrated in FIG. 2. FIG. 2 includes a depth column, a borehole image log 21, a White Light (WL) core photo 23, an Ultraviolet (UV) core photo 24, and a track highlighting sand intervals identified from core called a sand flag track 22. In FIG. 2, the borehole image log 21 has four intervals selected (21A, 21B, 21C, 21D) and the sand flag track 22 has corresponding intervals (22A, 22B, 22C, 22D) with their sand fractions (0.3, 1.0, 0.5, and 0.0, respectively). The sand flag track 22 may be developed from photos of a core such as the WL and UV photos, physical inspection of a core, or any other method for estimating sand fraction ($F_{sand}$) for depth intervals. The sand fractions from sand flag track 22 are used to label the selected intervals in the borehole image log 21 at operation 12 of method 100. Although this example has four selected intervals, in some embodiments there may be fewer or more intervals as needed in order to characterize the range of sand fractions in the well. There is an optional data augmentation step (operation 11) as illustrated in FIG. 3 which may occur before the labeling. The data augmentation is any method designed to alter the training data in a way that can provide additional samples of training data. For example, the four panels at the top of FIG. 3 show a process of random azimuthal shift. Each image is randomly shifted in the horizontal direction, so that the sinusoids that represent the sand layers would appear with different phases. As sinusoidal phase on borehole image is interpreted as orientation of sheet-like geological features (bed boundaries, fractures, deformation bands, etc.), this operation is to teach the network that the predicted sand fraction should be invariant as sand layers are inclined to different orientations. The random azimuth shift should not change the sand count ($F_{sand}$) but will train the machine-learning algorithm to be insensitive to azimuth. In another embodiment shown in the four panels at the bottom of FIG. 3, a depth shift may be applied. This shift is a positive or negative vertical shift. This will affect the sand count dependent on the depth shift. This embodiment teaches the machine-learning algorithm that the location of the sand beds is irrelevant. These examples of data augmentation are not meant to be limiting; any process that can be applied to the training data samples to generate additional likely images is within the scope of this invention such as stretching, rotation, flipping, cropping, and the like.

Figure 4:
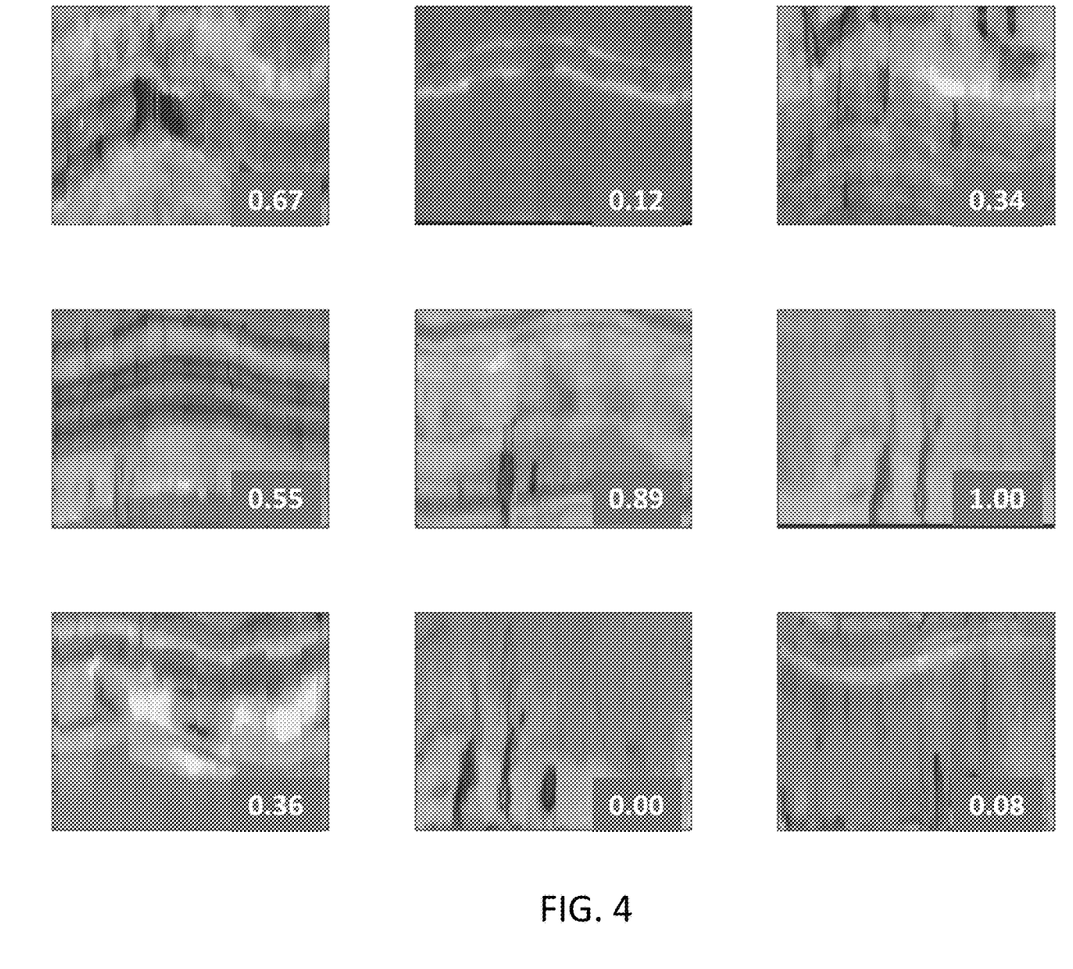
FIG. 4 illustrates a step of an embodiment.
Figure 5:
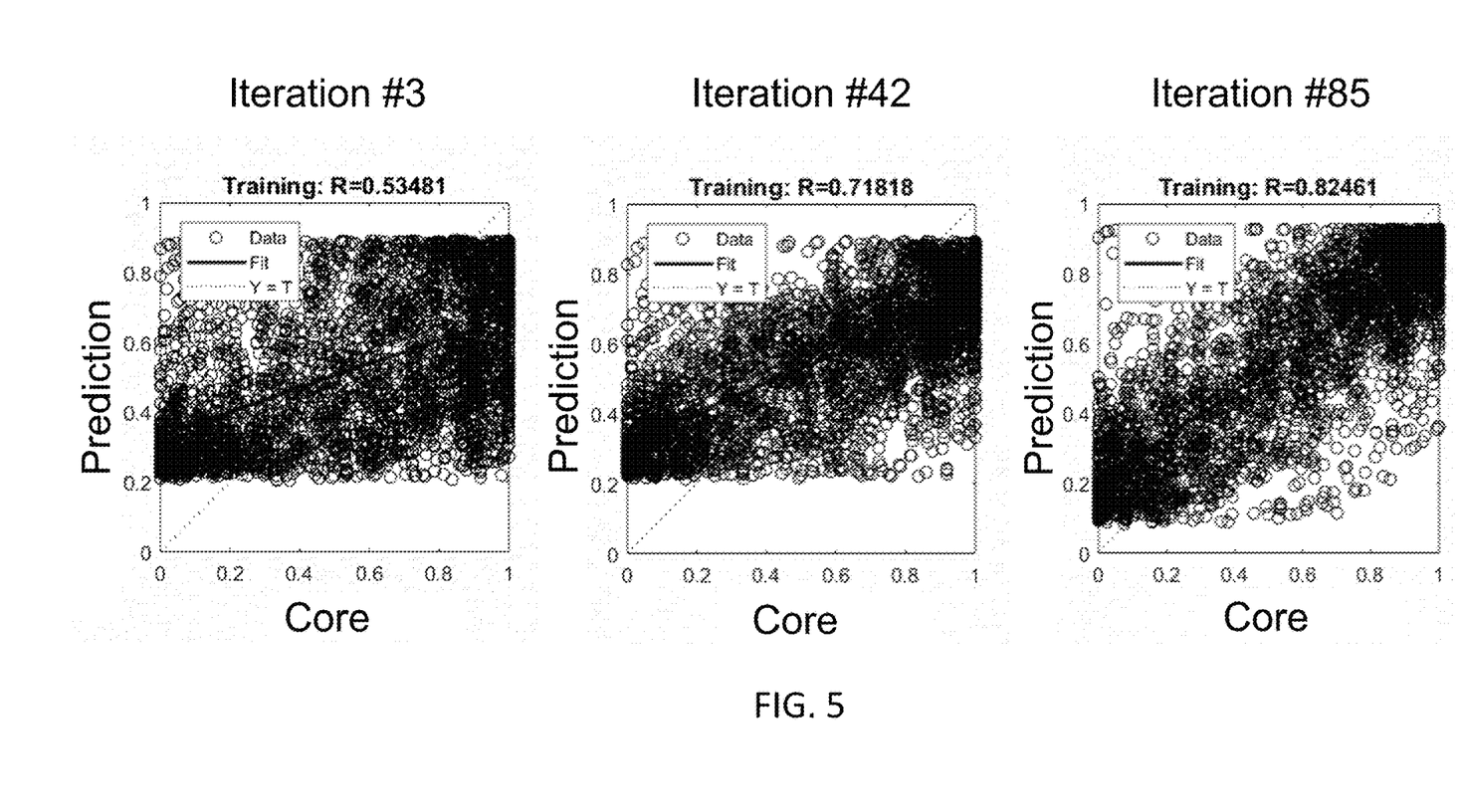
FIG. 5 illustrates a step of an embodiment.
Figure 6:
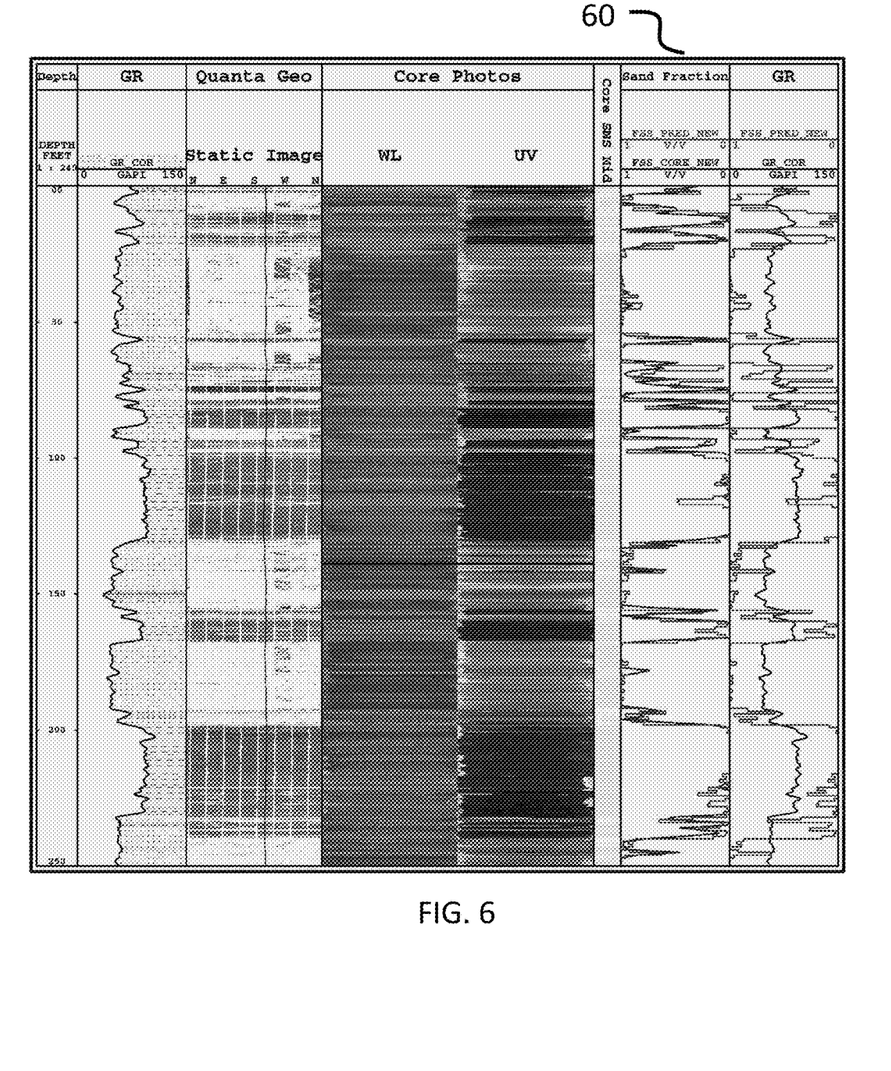
FIG. 6 illustrates a graphical display produced by an embodiment including a result of an embodiment.
Figure 7:
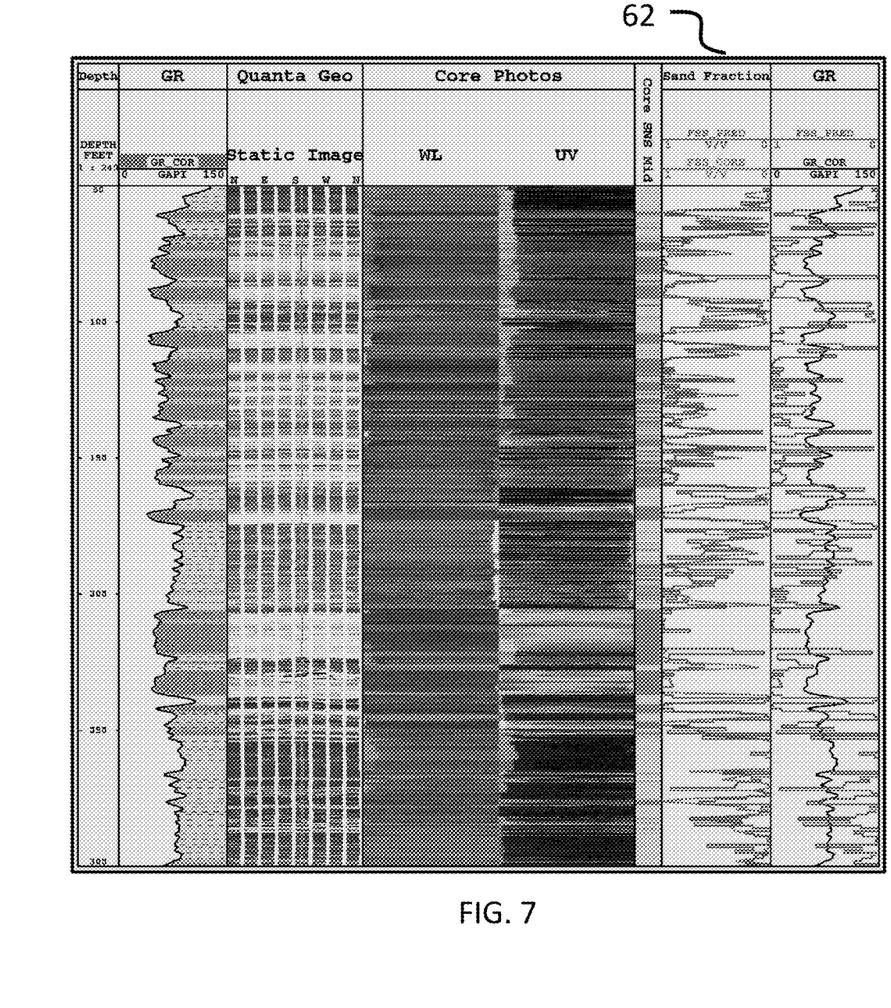
FIG. 7 illustrates a graphical display produced by an embodiment including a result of an embodiment.

The method then moves on to the machine-learning steps. Here, by way of example and not limitation, a neural network may be constructed at operation 13. The neural network may be trained and tested at operation 14, for example using training data like that shown in FIG. 4. The training and testing may be done iteratively as shown in FIG. 5. In the example of FIG. 5, the neural network is trained on 85% of the available labeled borehole image log intervals. The remaining 15% is used to test the accuracy of the predicted $F_{sand}$ after each iteration. This iterative process is performed if the accuracy requirements are not met at decision point 16 of method 100, so the neural network is modified at operation 15 and the training and testing are repeated. In FIG. 5, after 3 iterations the accuracy is R=0.53481 and the crossplot of the predicted $F_{sand}$ versus the $F_{sand}$ from core shows a cloud of points with no clear trend. A perfect result would have R=1.0 and a trend exactly matching 1:1 in the crossplot. After 42 iterations, the accuracy has improved to R=0.71818 and after 85 iterations the accuracy has improved to R=0.82461. The determination of whether the result is accurate enough may be done with a user-defined threshold or by allowing the machine-learning algorithm to identify it. Once the accuracy requirements are met, the neural network can be used to make $F_{sand}$ predictions at operation 17. These $F_{sand}$ predictions are shown in FIGS. 6 and 7 in the vertical tracks labeled 60 and 62, respectively, where the darker line is the predicted $F_{sand}$ from method 100 and the lighter line is a $F_{sand}$ that was estimated by a petrophysicist based on the core. The predicted $F_{sand}$ curves are very close to the $F_{sand}$ from the core. The trained neural network can then be used with borehole images from other wells in the same area or wells that are drilled in areas that are believed to be similar to the one from which the training data was derived.

Figure 8:
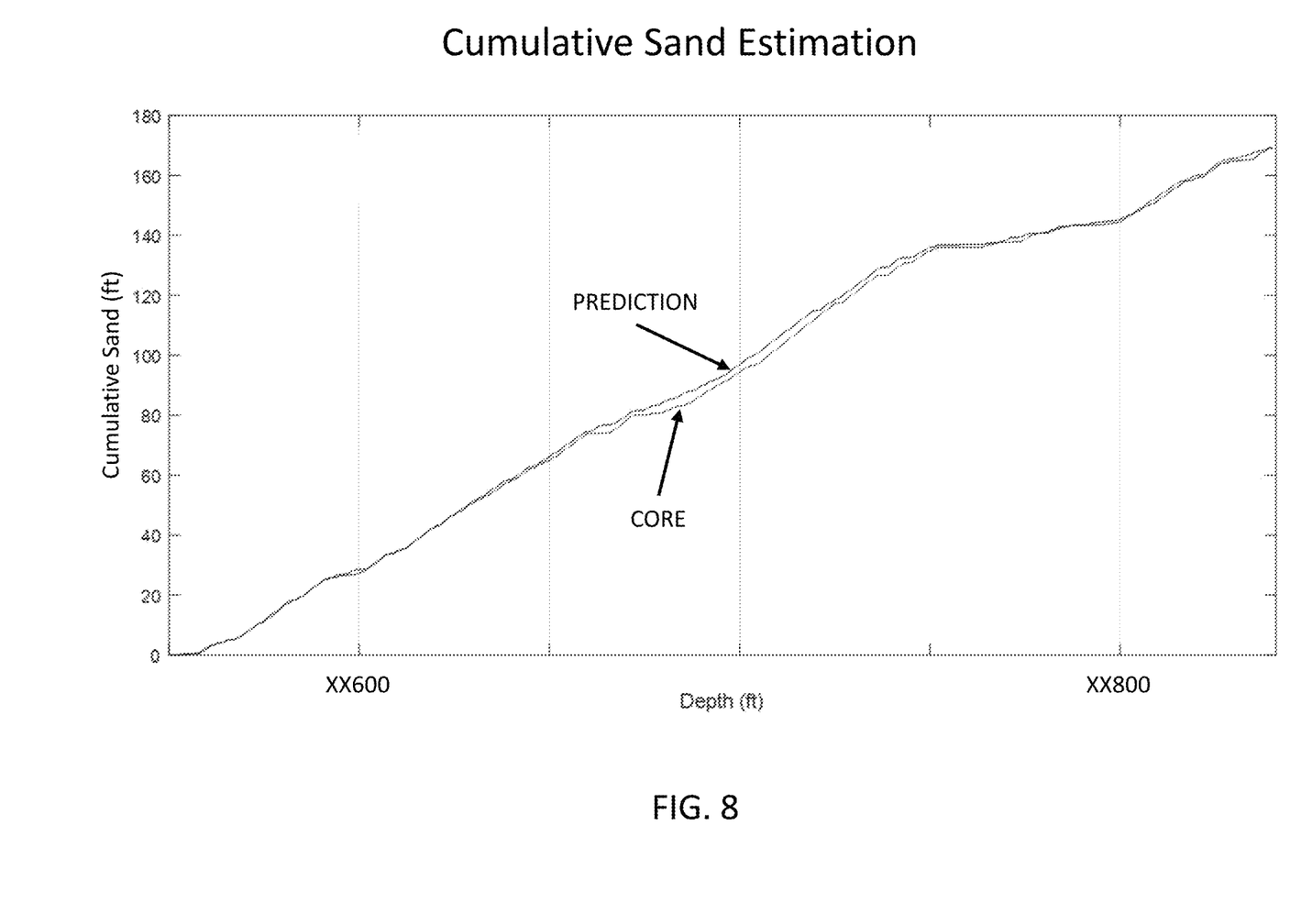
FIG. 8 compares a result of an embodiment with the expected answer.

Referring again to FIG. 1, the predicted $F_{sand}$ can then be used in operation 18 for a number of petrophysical analyses. For example, cumulative sand in a formation or an interval can be calculated by summing up the $F_{sand}$ values foot by foot, as shown in FIG. 8. Hydrocarbon in place can then be calculated through equation $HCIP = A \times h_c \times \phi \times (1-S_w)/B$, where HCIP is hydrocarbon in place, A is the area of the reservoir, $h_c$ is cumulative sand thickness (net sand thickness), $\phi$ is the porosity of the net sand, $S_w$ is the water saturation of the net sand, and B is the formation volume factor. This will impact decisions on where to drill, optimal wellpaths, and how to complete wells.

Figure 9:
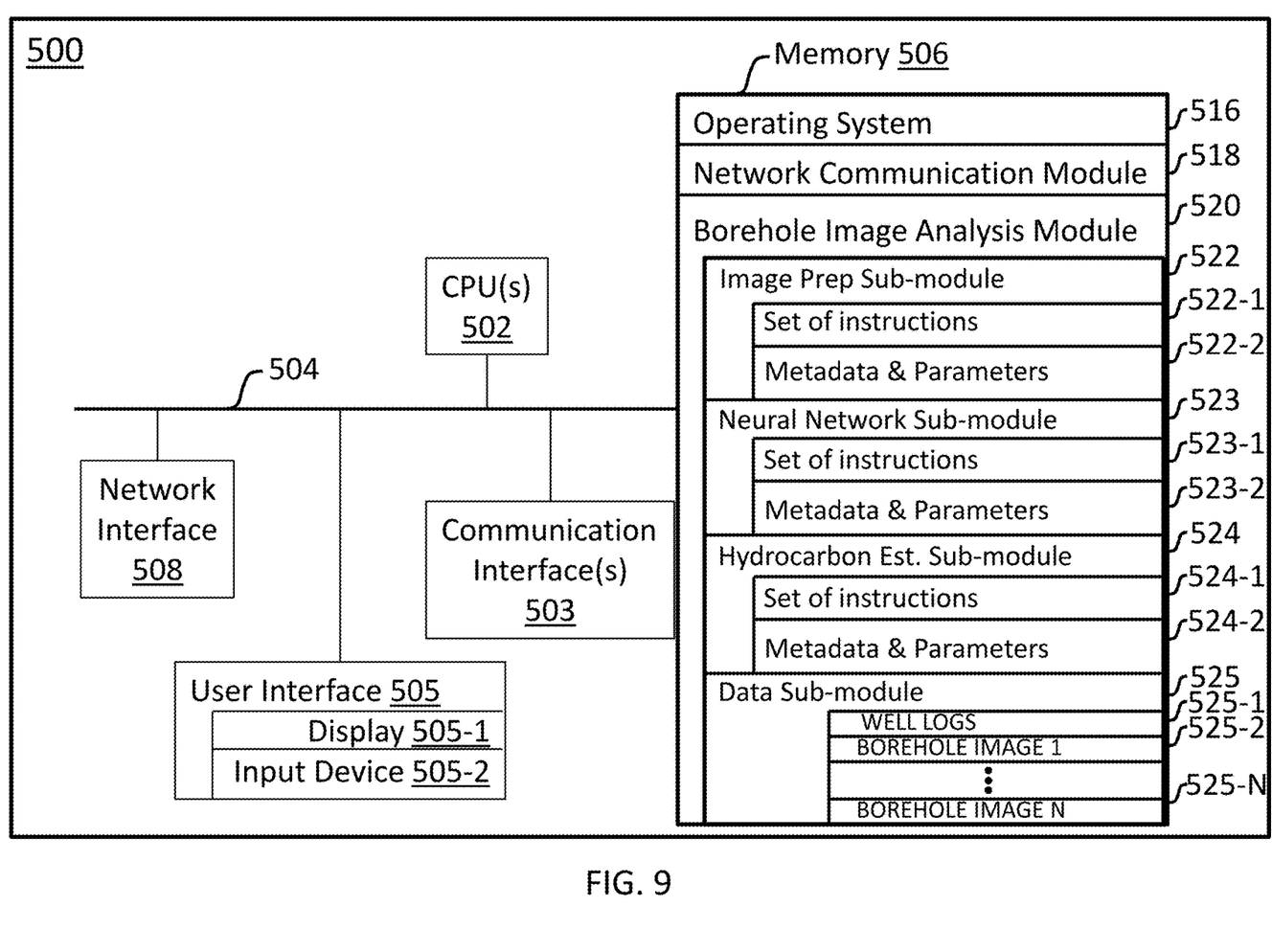
FIG. 9 is a block diagram illustrating a borehole image analysis system, in accordance with some embodiments.

FIG. 9 is a block diagram illustrating a borehole image analysis system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the borehole image analysis system 500 includes one or more processing units (CPUs) 502, one or more network interfaces 508 and/or other communications interfaces 503, memory 506, and one or more communication buses 504 for interconnecting these and various other components. The borehole image analysis system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store well logs, borehole images, and processed data products.

In some embodiments, memory 506 or the non-transitory computer readable storage medium of memory 506 stores the following programs, modules and data structures, or a subset thereof including an operating system 516, a network communication module 518, and a borehole image analysis module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the borehole image analysis module 520 executes the operations of method 100. borehole image analysis module 520 may include data sub-module 525, which handles the well logs and borehole images 525-1 through 525-N. This data is supplied by data sub-module 525 to other sub-modules.

Image preparation sub-module 522 contains a set of instructions 522-1 and accepts metadata and parameters 522-2 that will enable it to execute the division and labeling of the borehole images as described in method 100, and optionally the data augmentation. The neural network sub-module 523 contains a set of instructions 523-1 and accepts metadata and parameters 523-2 that will enable it to execute the machine-learning operations of method 100. Although this example labels this module as a neural network, it is within the scope of this invention for any machine-learning algorithm, for example generative adversarial networks (GANs), to be used. The hydrocarbon estimation sub-module 524 contains a set of instructions 524-1 and accepts metadata and parameters 524-2 that will enable it to execute petrophysical analyses such as cumulative sand and hydrocarbon in place for method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and generate the graphical image including a $F_{sand}$ prediction. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 9) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
   a. receiving, at one or more computer processors, a borehole image, wherein the borehole image traverses a subsurface formation including sand and non-sand layers;
   b. dividing, via the one or more computer processors, the borehole image into multiple divided borehole images, individual divided borehole images traversing an interval of the subsurface formation;
   c. selecting, via the one or more computer processors, a subset of the multiple divided borehole images for use as training data;
   d. labeling, via the one or more computer processors, the subset of the multiple divided borehole images with sand fraction values based on core analysis of the sand and non-sand layers in the subsurface formation;
   e. training, via the one or more computer processors, a neural network using the subset of the multiple divided borehole images labeled with sand fraction values to generate a trained neural network; and
   f. predicting, via the one or more computer processors, a fraction of sand (Fsand) in a subsurface volume using the trained neural network.

2. The method of claim 1 further comprising augmenting the training data prior to the labeling, wherein augmenting the training data includes altering the training data to provide additional samples for training the neural network.

3. The method of claim 2 wherein the augmenting the training data includes azimuthal shifts of the subset of the multiple divided borehole images in horizontal direction such that sinusoids representing the sand layers in the subset of the multiple divided borehole images appear with different phases.

4. The method of claim 2 wherein the augmenting the training data includes depth shifts of the subset of the multiple divided borehole images in vertical direction to teach the neural network that location of sand beds is irrelevant.

5. The method of claim 1 further comprising using the Fsand to estimate at least one of cumulative sand and hydrocarbon in place.

6. A computer system comprising:
   one or more processors;
   memory; and
   one or more programs, wherein the one or more programs are stored in the memory and configured to be executed by the one or more processors, the one or more programs including instructions that when executed by the one or more processors cause the computer system to:
   a. receive, at the one or more processors, a borehole image, wherein the borehole image traverses a subsurface formation including sand and non-sand layers;
   b. divide, via the one or more processors, the borehole image into multiple divided borehole images, individual divided borehole images traversing an interval of the subsurface formation;
   c. select, via the one or more processors, a subset of the multiple divided borehole images for use as training data;
   d. label, via the one or more processors, the subset of the multiple divided borehole images with sand fraction values based on core analysis of the sand and non-sand layers in the subsurface formation;
   e. train, via the one or more processors, a neural network using the subset of the multiple divided borehole images labeled with sand fraction values to generate a trained neural network; and
   f. predict, via the one or more computer processors, a fraction of sand (Fsand) in a subsurface volume using the trained neural network.

7. The computer system of claim 6 further including instructions that when executed by the one or more processors cause the computer system to augment the training data prior to the labeling, wherein augmenting the training data includes altering the training data to provide additional samples for training the neural network.

8. The computer system of claim 6 further including instructions that when executed by the one or more processors cause the computer system to use the Fsand to estimate at least one of cumulative sand and hydrocarbon in place.

9. A non-transitory computer readable storage medium storing one or more programs, the one or more programs comprising instructions, which when executed by an electronic device with one or more processors and memory, cause the device to execute:
   a. receive, at one or more processors, a borehole image, wherein the borehole image traverses a subsurface formation including sand and non-sand layers;
   b. divide, via the one or more processors, the borehole image into multiple divided borehole images, individual divided borehole images traversing an interval of the subsurface formation;
   c. select, via the one or more processors, a subset of the multiple divided borehole images for use as training data;
   d. label, via the one or more processors, the subset of the multiple divided borehole images with sand fraction values based on core analysis of the sand and non-sand layers in the subsurface formation;
   e. train, via the one or more processors, a neural network using the subset of the multiple divided borehole images labeled with sand fraction values to generate a trained neural network; and
   f. predict, via the one or more computer processors, a fraction of sand (Fsand) in a subsurface volume using the trained neural network.

10. The non-transitory computer readable storage medium of claim 9 further comprising instructions that when executed by the one or more processors cause the device to augment the training data prior to beginning the labeling, wherein augmenting the training data includes altering the training data to provide additional samples for training the neural network.

11. The computer system of claim 9 further comprising instructions that when executed by the one or more processors cause the computer system to use the Fsand to estimate at least one of cumulative sand and hydrocarbon in place.

12. The computer system of claim 7 wherein the augmenting the training data includes azimuthal shifts of the subset of the multiple divided borehole images in horizontal direction such that sinusoids representing the sand layers in the subset of the multiple divided borehole images appear with different phases.

13. The computer system of claim 7 wherein the augmenting the training data includes depth shifts of the subset of the multiple divided borehole images in vertical direction to teach the neural network that location of sand beds is irrelevant.

14. The non-transitory computer readable storage medium of claim 10 wherein the augmenting the training data includes azimuthal shifts of the subset of the multiple divided borehole images in horizontal direction such that sinusoids representing the sand layers in the subset of the multiple divided borehole images appear with different phases.

15. The non-transitory computer readable storage medium of claim 10 wherein the augmenting the training data includes depth shifts of the subset of the multiple divided borehole images in vertical direction to teach the neural network that location of sand beds is irrelevant.

* * * * *